Figure 1:
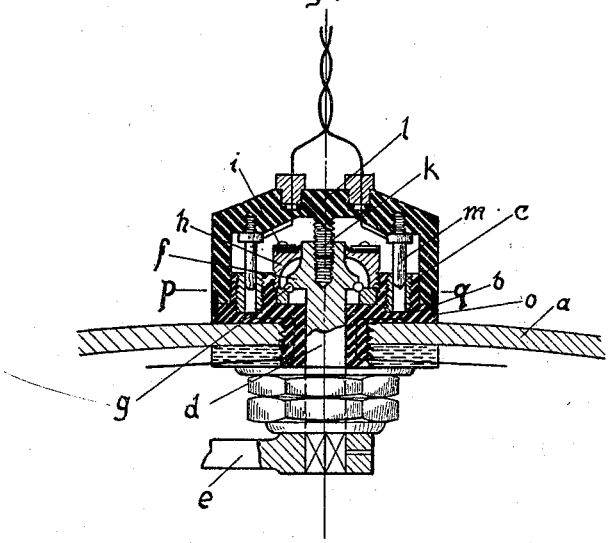

July 29, 1924.  
F. GALL  
1,503,238  
ELECTRIC CONNECTING DEVICE FOR FLOATING OR SUBMARINE VESSELS  
Filed Aug. 31, 1921

Inventor  
Friedrich Gall

Patented July 29, 1924.

1,503,238

UNITED STATES PATENT OFFICE.

FRIEDRICH GALL, OF KIEL, GERMANY.

ELECTRIC CONNECTING DEVICE FOR FLOATING OR SUBMARINE VESSELS.

Application filed August 31, 1921. Serial No. 497,424.

*To all whom it may concern:*

Be it known that I, FRIEDRICH GALL, citizen of the German Republic, and residing at Kiel, county of Schleswig-Holstein, State of Prussia, Germany, have invented certain new and useful Improvements in Electric Connecting Devices for Floating or Submarine Vessels (for which I have filed applications in Germany, July 27, 1916; Holland, May 25, 1920; Denmark, May 25, 1920; Sweden, May 29, 1920; Norway, May 29, 1920; and in England, July 10, 1920), of which the following is a specification.

The invention relates to electric connecting devices arranged on the walls of practically closed navigable floating or submarine vessels for the purpose of establishing a connection with the exterior. Electric connecting devices of this kind, by which the connection is made whilst out of the water, are used on submarine boats and appliances, and especially on diving armors, where they are used for connecting up telephone cables for example. Cases often arise in which a diver desires to disconnect the cable from his armor, as for example when the cable has got caught and hinders his movements, or when the diver has to enter places in which the cable would be troublesome, as for instance in a sunken vessel. The ordinary simple electric plug sockets cannot be used for diving armors because the connection between plug and socket can be too easily broken. On the other hand it is not possible for the diver to undo complicated external connections with his armored hand which always gives rise to a certain awkwardness.

The object of the invention is to enable the parts of the external connecting device to be separated, and the cable to be cast off, by manipulations performed in the interior of the vessel without in any way derogating the safe exclusion of the water. This is accomplished by dividing the connecting device in two parts one of which is immovably fixed in the wall of the vessel and arranged as to prevent the penetration of water under pressure, while the other forms the terminal of the cable that is to be connected to the armor. This part or terminal is preferably made in the form of a cap arranged to be slipped onto the fixed part. It is preferably provided with a threaded pin onto which a threaded sleeve may be screwed which is arranged to revolve in the said fixed part without moving therein in the direction of its length. This threaded sleeve or spindle is adapted to be revolved by the diver inside the armor, whereby the cable terminal or movable part of the device may be fastened to, or loosened from, the fixed part.

A sealing member is interposed between the two parts so as to make their joints perfectly water-tight and to prevent the penetration of water into the hollow chamber enclosed by the cap-shaped part. To prevent the penetration of water into the armor after the detachable part with the cable is cast off a sealing means is provided which makes the joint between the said spindle and the fixed part perfectly impenetrable to water under pressure.

The actual contact-making elements may be shaped like the ordinary well known electric plugs or in any other fashion. In the former case arrangements must be made for dis-connecting the electric contacts before the cap is removed from the fixed part. Besides, the movable part must be guided on the fixed part so as to slip off and on without turning and to thus prevent the contact pins from being bent.

The invention is illustrated in the drawing. Fig. 1 is a vertical section of a constructional form of the novel connecting device attached to the wall of a diver's armor or of a submarine boat, or the like.

Figure 2:
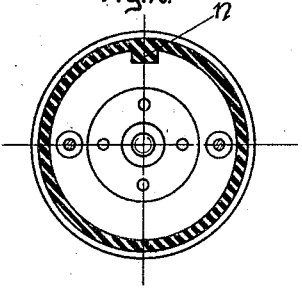

Fig. 2 is a section on line *p—q* of Fig. 1.

The fixed part of the electrical-connecting device consists of a sleeve *b* which is screwed into the wall *a* of the vessel. The sleeve is arranged to receive contact thimbles *c* of an ordinary kind and a revoluble spindle *d* that passes through the sleeve and is provided at its bottom end at the inside of the vessel with a handle *e*. At its upper end the spindle has a collar *f* which forms one part of a ball bearing *g* that is arranged in the sleeve *b* and enables the spindle to be turned with ease. Screwed into the recess formed in the sleeve for the reception of the ball bearing is a ring *h* whose upper surface supports a packing ring *i* that prevents water from penetrating between the spindle and the sleeve.

A threaded pin *k* projects into the thread of the spindle, the said pin being situated at the centre of the detachable cap *l* and adapted to move this cap up and down when the spindle is turned. The cap also carries contact pins $m$ that cooperate with the thimbles $c$. The length of the threaded pin $k$ is such that when the connection between the fixed and movable parts is broken by turning the handle $e$, the contact pins leave the thimbles before the said parts $b$ and $l$ are separated, the movable part being guided when moving by a groove and tongue $m$.

At the place where the parts $b$ and $l$ meet, a sealing member $o$ is provided which consists of a high ring of rectangular cross-section that covers the joint between the two parts and whose pressure against the joint to be sealed grows as the water depth increases.

Instead of the wires being connected by pins and thimbles any other electrical connecting means may be employed.

I claim:

1. In an electrical connecting device for floating or submarine vessels, a fixed contact member attached to the wall of the vessel, an exterior detachable contact member adapted to cooperate with the fixed contact member, and means for detaching the exterior detachable member from the fixed member by a manipulation performed in the interior of the vessel.

2. In an electrical connecting device for floating or submarine vessels, a fixed contact member attached to the wall of the vessel, an exterior detachable contact member adapted to cooperate with the fixed contact member, and means for detaching the exterior detachable member from the fixed member by a manipulation performed in the interior of the vessel, the exterior member being shaped in the form of a cap adapted to slip over the fixed member without revolving, and sealing means for preventing water under pressure from entering the vessel through the connecting device.

3. In an electrical connecting device for floating or submarine vessels, a fixed contact member attached to the wall of the vessel, an exterior detachable contact member adapted to cooperate with the fixed contact member, and means for detaching the exterior detachable member from the fixed member by a manipulation performed in the interior of the vessel, the said detaching means consisting of a spindle journalled in the fixed contact member so as to be revoluble but not otherwise movable in the said member.

In testimony whereof I affix my signature in presence of two witnesses.

FRIEDRICH GALL.

Witnesses:
WILHELM FRISCHBECH,
KARL HANS BUSCH.